United States Patent [19]

Goff et al.

[11] Patent Number: 4,697,125
[45] Date of Patent: Sep. 29, 1987

[54] METHOD AND APPARATUS FOR DETERMINING SHAFT POSITION AND FOR PROVIDING COMMUTATION SIGNALS

[75] Inventors: Jerry K. Goff, Doylestown; Gary E. Chizever, Abington, both of Pa.

[73] Assignee: Performance Controls, Inc., Horsham, Pa.

[21] Appl. No.: 843,218

[22] Filed: Mar. 24, 1986

[51] Int. Cl.$^4$ .............................................. H02P 6/02
[52] U.S. Cl. ................................ 318/254; 318/138; 318/439; 318/567; 318/569; 318/600
[58] Field of Search ............... 318/138, 254, 439, 560, 318/567, 568 B, 568 D, 569, 594, 600, 312, 313, 314, 326, 327, 328; 324/83 D; 340/347 P, 870.22, 671, 686, 870.24

[56] References Cited

U.S. PATENT DOCUMENTS

| | | | |
|---|---|---|---|
| 3,745,544 | 7/1973 | Ono | 324/83 D X |
| 3,813,592 | 5/1974 | Ryberg | 318/601 X |
| 3,831,170 | 8/1974 | Christensen | 340/870.22 X |
| 4,031,478 | 6/1977 | Clark | 328/134 |
| 4,072,893 | 2/1978 | Huwyler | 324/208 |
| 4,157,507 | 6/1979 | Desai | 324/134 |
| 4,183,014 | 1/1980 | McClean | 340/347 P X |
| 4,220,924 | 9/1980 | Osann | 328/119 |
| 4,328,463 | 5/1982 | Avins | 328/133 |
| 4,412,206 | 10/1983 | Schwefel | 340/347 P |
| 4,417,188 | 11/1983 | Makabe et al. | 318/696 |
| 4,442,532 | 4/1984 | Takemura | 340/347 P X |
| 4,443,787 | 4/1984 | Denk | 340/347 P |
| 4,479,078 | 10/1984 | Kidd et al. | 318/254 |
| 4,485,452 | 11/1984 | Cording | 364/565 |
| 4,496,936 | 1/1985 | Kramer | 340/347 P |
| 4,532,461 | 7/1985 | Crook | 318/254 |
| 4,572,999 | 2/1986 | Coulon, Jr. | 318/327 X |

FOREIGN PATENT DOCUMENTS

| | | | |
|---|---|---|---|
| 55-106095 | 8/1980 | Japan | 318/254 |
| 55-142000 | 11/1980 | Japan | 318/254 |
| 56-74094 | 6/1981 | Japan | 318/254 |
| 57-68697 | 4/1982 | Japan | 318/254 |
| 57-162994 | 10/1982 | Japan | 318/254 |
| 58-92005 | 6/1983 | Japan | 318/567 |
| 58-96305 | 6/1983 | Japan | 318/567 |
| 58-163298 | 9/1983 | Japan | 318/254 |

Primary Examiner—William M. Shoop, Jr.
Assistant Examiner—Bentsu Ro
Attorney, Agent, or Firm—William H. Eilberg

[57] ABSTRACT

The invention provides a method and apparatus for determining the angular displacement of a rotating shaft, and for commutation of a brushless motor. At least two analog sensors, mounted near the shaft, generate phase-displaced analog signals responsive to the angular position of the shaft. A logic circuit produces a digital code indicating the region of the cycle in which the shaft is instantaneously located. An analog multiplexor selects a unique pair of analog signals from the group of the original analog signals and their analog complements, according to the value of the digital code. An analog to digital converter then generates a digital signal proportional to the quotient of the analog signals produced by the multiplexor, and this digital signal, together with the digital code, is used to activate an address in a memory device. The memory device, such as an EPROM, is programmed with a large number of binary digits, which define a train of pulses. As the shaft turns, the addresses in the EPROM are activated in a predetermined order, producing a train of pulses whose frequency is directly proportional to the angular velocity of the shaft. The EPROM can be programmed to generate parallel trains of pulses, including "quadrature" pulses, which encode the direction as well as the displacement of the shaft, and commutation pulses, for controlling a brushless motor. The circuit therefore can be used to monitor the angular displacement of the shaft and, at the same time, to control the motor which drives that shaft.

39 Claims, 6 Drawing Figures

METHOD AND APPARATUS FOR DETERMINING SHAFT POSITION AND FOR PROVIDING COMMUTATION SIGNALS

BACKGROUND OF THE INVENTION

The present invention relates to the field of incremental encoders, i.e. devices which monitor the angular displacement of a rotating shaft. The invention also provides a means of generating commutation signals necessary for controlling the operation of brushless motors.

Various methods of measuring angular displacements of motor shafts have been proposed in the prior art. For example, U.S. Pat. No. 3,745,544 discloses an apparatus for digitally measuring the angle of rotation of a shaft. The device uses a set of rotating disks attached to the shaft, the disks having slotted portions which are used to produce information on angular position. The outputs of a plurality of magnetic sensors are passed through digital logic circuitry to produce the desired information.

A frequently used method of determining the angular position of a shaft is directing a light beam at a slotted disk, thereby causing a series of pulses to be generated. U.S. Pat. No. 4,328,463 shows an example of an arrangement of this type. Another system for measuring the angular position of a shaft is described in U.S. Pat. No. 4,443,787, which also uses a light-driven device to derive its basic measurement of a reference position of the shaft.

It has also been known to generate a series of digital pulses, corresponding to an analog signal which represents displacement of a shaft, and to sum those pulses to obtain a measurement of absolute angular displacement. An example of such a technique is given in U.S. Pat. No. 4,072,893.

The measurement of angular displacement of a shaft is typically based on two phase-shifted signals representing the motion of the shaft. When these signals are 90° out of phase, the signals are called "quadrature" signals. The quadrature signals, taken together, encode both the angular displacement and the direction of motion of the shaft. Methods for determining displacement and direction of motion, from a train of quadrature pulses, are well known in the art, as exemplified by U.S. Pat. Nos. 4,157,507 and 4,442,532. U.S. Pat. No. 4,220,924 discloses another circuit for processing a pairS of quadrature-phased digital signals.

Encoders of the prior art, which typically use optical disks for generating a pulse train, have certain disadvantages. The rotating disks are mechanical devices which are prone to malfunction. The light beams used to generate signals must be precisely aligned, and can be easily disturbed by unwanted vibrations or other movements. An optical system is not reliable in a dusty enviroment, because the dust clouds the light sensors. The brightness of the light emitting diodes, commonly used in optical systems, is likely to decay over time. The present invention provides a system which has no moving parts, other than the shaft and armature magnets themselves. This construction adds considerably to the ruggedness and reliability of the system.

The present invention also provides commutation signals necessary for the control of a brushless motor. Brushless motor windings are usually commutated according to a fixed timing scheme. That is, over a 360° cycle, the various armature windings are energized and deenergized with a fixed timing sequence. With this scheme, however, the torque of the motor decreases at higher rotational speeds. This reduction in torque is believed to be due to the phase delay caused by the nonzero inductance and resistance of the motor windings. As the motor speed increases, the frequency of the commutation signals increases, and the inductance of the windings becomes more significant. The commutation signal is, in effect, delayed relative to its proper timing.

One can compensate for this delay by advancing the commutation signals by a certain angular displacement, depending on the motor speed. For example, the amount of commutation advance can be made directly proportional to the speed of the motor. The effective speed range of the motor is thereby increased, because the motor does not lose torque at higher rotational velocities.

The present invention provides means for generating commutation pulses, for various amounts of advance or retard. The present invention therefore has the additional advantage that it provides both quadrature pulses and commutation pulses in the same apparatus. The invention can therefore be used both to monitor the angular displacement and direction of rotation of a shaft, and to control effectively the brushless motor which drives that shaft.

SUMMARY OF THE INVENTION

The present invention comprises an apparatus and method for generating a train of quadrature pulses, which can be used to determine the angular displacement and direction of rotation of a shaft. The same apparatus and method also generates commutation signals, having varying amounts of advance or retard, these signals being usable in the automatic control of a brushless motor over a range of rotational speeds.

A pair of analog sensors, disposed near the rotating shaft, produce signals indicative of the instantaneous angular position of the shaft. In the preferred embodiment, these signals are 90° out of phase with each other. The analog complements of both signals are also formed.

Each 360° (magnetic) cycle of rotation is envisioned as being divided into several equal regions. In the embodiment described below, each region is 45°, but other divisions are possible. Through a network of logic elements, the system determines in what region the shaft is instantaneously located, and produces a digital code which indicates that region. The system then produces a pair of analog signals, the signals being selected from the original pair of analog signals and their complements. The particular signals selected for this pair depends on the region in which the shaft is located. The signals are selected such that their quotient is nonnegative and les than or equal to unity. An analog to digital converter produces a digital signal which is proportional to the quotient of these analog signals. This digital signal represents a relative address in a memory device, such as an EPROM. When combined with the digital code indicating the region, the digital signal becomes an absolute address in the EPROM.

The memory device is pre-programmed with a large number of binary digits in its various addresses. The binary digits are arranged such that as the various addresses are activated in the correct order, the output of the memory device will be a train of pulses, or, in the preferred embodiment, a set of parallel trains of pulses, having specific characteristics. The address in the memory device which is activated at any given instant is determined by the value of the above-described digital signal and by the digital code indicating the region in which the shaft is currently located.

Each address of the memory device preferably contains at least five binary digits (bits). Two of these bits are used to form part of the two quadrature pulse trains needed to determine angular position and direction of rotation. The other three bits form part of the three commutation signals which are used on conventional three-phase brushless motors. For each value of the digital signal, and for each region, and for each desired level of commutation advance or retard, a different segment of the memory device is activated. As the shaft turns, the successive addresses of the memory device are activated, producing the desired trains of pulses.

The arrangement of bits in the memory device is designed to compensate for the nonlinearity of the initial analog signals. If the initial analog signals are sinusoidal, and if the initial analog signals are 90° out of phase, then the bits must be arranged according to an arctangent function, to insure that the output pulses will properly reflect the rotational motion of a point on the shaft. The result is that, for constant angular velocity, the quadrature pulses produced will have uniform width and constant frequency. The absolute angular position of the shaft can be determined by summing the pulses in either member of the quadrature pair.

It is therefore an object of the invention to provide an encoding circuit for generating a series of quadrature pulses, for determining the angular displacement and direction of rotation of a shaft.

It is another object of the invention to provide an encoding circuit as described above, wherein the circuit has no moving parts.

It is another object of the invention to provide an encoding circuit which also provides commutation control pulses for a brushless motor.

It is another object of the invention to provide an encoding circuit which provides commutation control pulses for varying levels of commutation advance.

It is another object of the invention to provide a device which both monitors the angular displacement of a shaft, and also controls the motor which drives the shaft.

It is another object of the invention to provide a device which can be used to vary automatically the level of commutation advance or retard of a brushless motor, depending on the velocity of rotation of the motor shaft.

It is another object of the invention to provide a memory circuit for generating pulse trains for the device described above.

It is another object of the invention to provide a method of measuring the angular displacement of a shaft, and of providing commutation control for a brushless motor.

Other objects and advantages of the invention will be apparent to those skilled in the art from a reading of the following brief description of the drawings, the detailed description of the invention, and the appended claims.

DETAILED DESCRIPTION OF THE INVENTION

One object of the present invention is to provide quadrature pulse trains which facilitate the measurement of angular displacement of a shaft and its direction of rotation. Another object is to generate pulse trains which act as commutation signals for the motor which drives the shaft. The invention generates these quadrature and commutation pulses by sequentially triggering various addresses of a digital memory device, such as an erasable programmable read-only memory (EPROM). If the bits in each address of the EPROM are properly programmed, activation of sequences of addresses of the EPROM will generate the desired pulse trains.

Before discussing each component of the invention in detail, it is helpful to discuss the general operation of the invention. The discussion that follows is a general description, and relates mainly to the block diagram of FIG. 5. A description of the contents of each of the blocks will follow this discussion.

Figure 5:
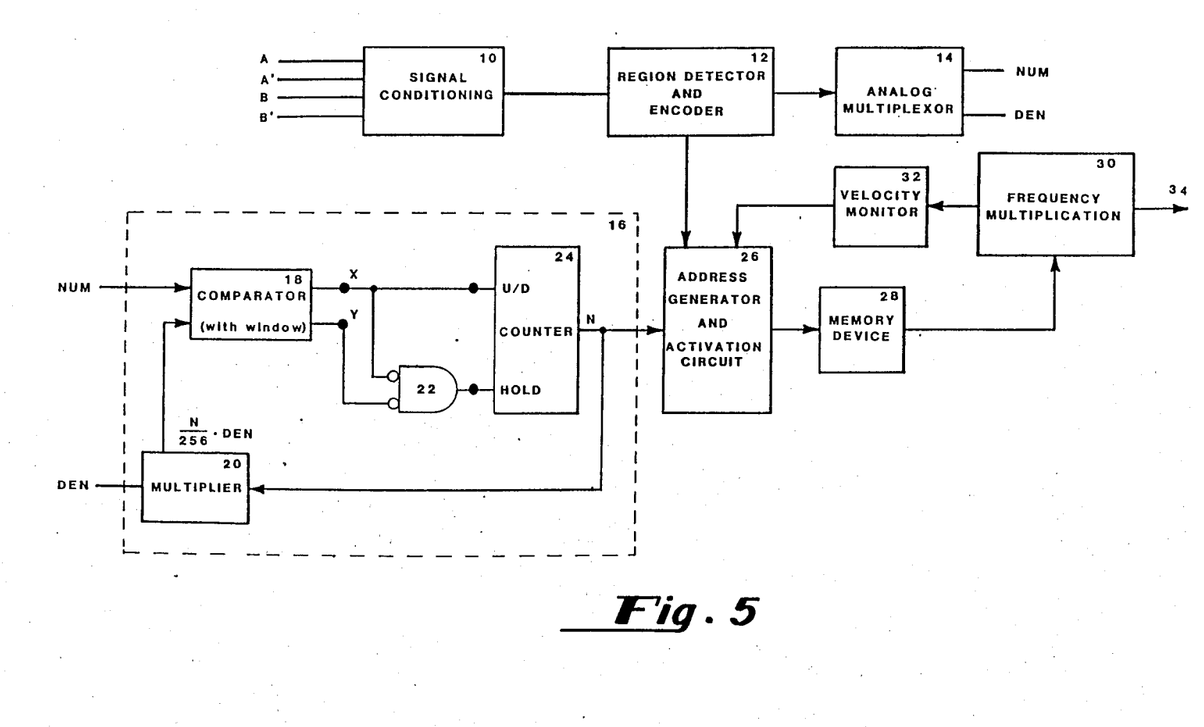
FIG. 5. is a block diagram of the components of the present invention, in the preferred embodiment.

The major components of the system of the present invention are shown in the block diagram of FIG. 5. Two analog signals, designated as A and B, and their analog complements A' and B', representing the position of the shaft, are provided as inputs to the system. These signals can come from analog sensors disposed near the rotating shaft. The sensors are placed such that their signals are out of phase. The phase relationships will be discussed more fully, below.

The signals A and B, and their complements, are processed by signal conditioning circuit 10, which compensates for the effects of different types of sensors. For example, circuit 10 may compensate for the gain or offset voltage of the particular sensor used. The signals are then fed to region detector circuit 12. Circuit 12 determines, by comparing the values of A and B and their complements, the angular region within which the shaft is instantaneously located. Circuit 12 generates a digital code indicative of that region.

The digital code is transmitted to analog multiplexor 14. The multiplexor produces a pair of analog output signals, designated as "NUM" and "DEN". These signals are selected from the group consisting of A, B, A', and B', according to the particular region in which the shaft is momentarily located.

Analog to digital (A/D) converter 16 then forms a digital signal proportional to the quotient of the NUM and DEN signals. This digital signal is then fed to an address generator and activation circuit 26, which is connected to activate addresses in memory device 28. Memory device 28 can be an EPROM or other suitable device. The output of A/D converter 16 comprises a relative address in the EPROM. The address generator 26 also receives an input from the region detector 12. The digital code representing the region, together with the output of A/D converter 16 changes sequentially, various sequential addresses in the EPROM are activated. The EPROM is preprogrammed with bit patterns which form the desired quadrature and commutation pulse trains.

FIG. 5 also shows a feedback loop which enables the system to provide automatic commutation control for a brushless motor. An explanation of this feedback loop is given in the detailed description that follows.

Figure 1:
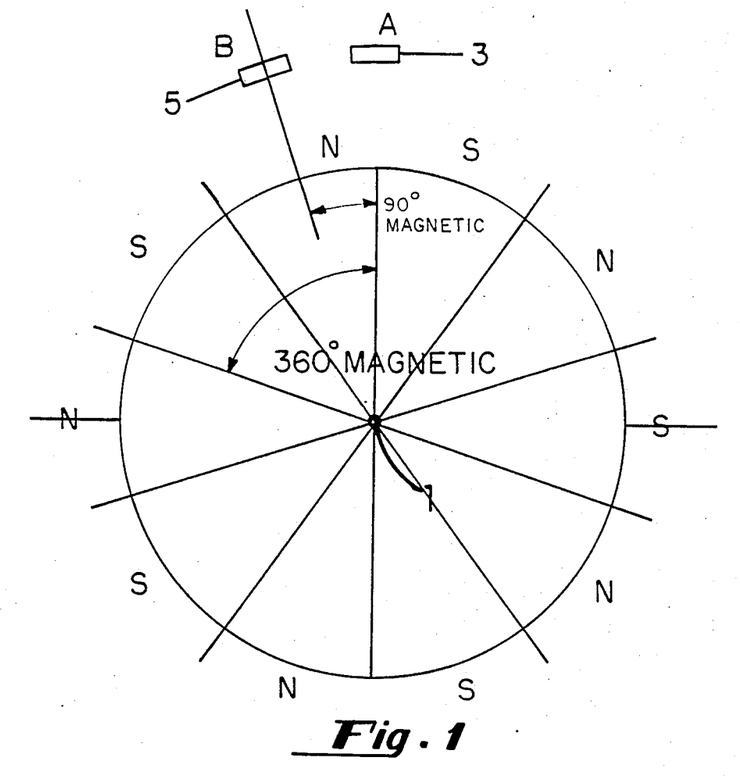
FIG. 1 is a schematic representation of a brushless motor shaft having five pole pairs, and indicating the approximate locations of a pair of analog sensors.

A means of generating the initial analog signals A and B is shown in FIG. 1. The figure shows two analog sensors disposed near rotating shaft 1 to produce analog signals corresponding to the rotation of the shaft. Shaft 1 is assumed to have a set of five permanent magnets mounted thereon, and rotates under the influence of fixed electromagnets (not shown) located around the shaft. Because there are five pole pairs in the example given, a 360° rotation, in the magnetic sense, corresponds to only a 72° rotation in the physical sense. For the sake of clarity, the angles described in this specification are magnetic.

Analog sensors 3 and 5 are disposed around the shaft 1, and are displaced 90° (magnetic) from each other. Sensors 3 and 5 can be linear Hall effect sensors. However, other types of sensors can be used. Also, the number of analog sensors can be greater than two, and the number of pole pairs can be greater or less than five.

Figure 2:
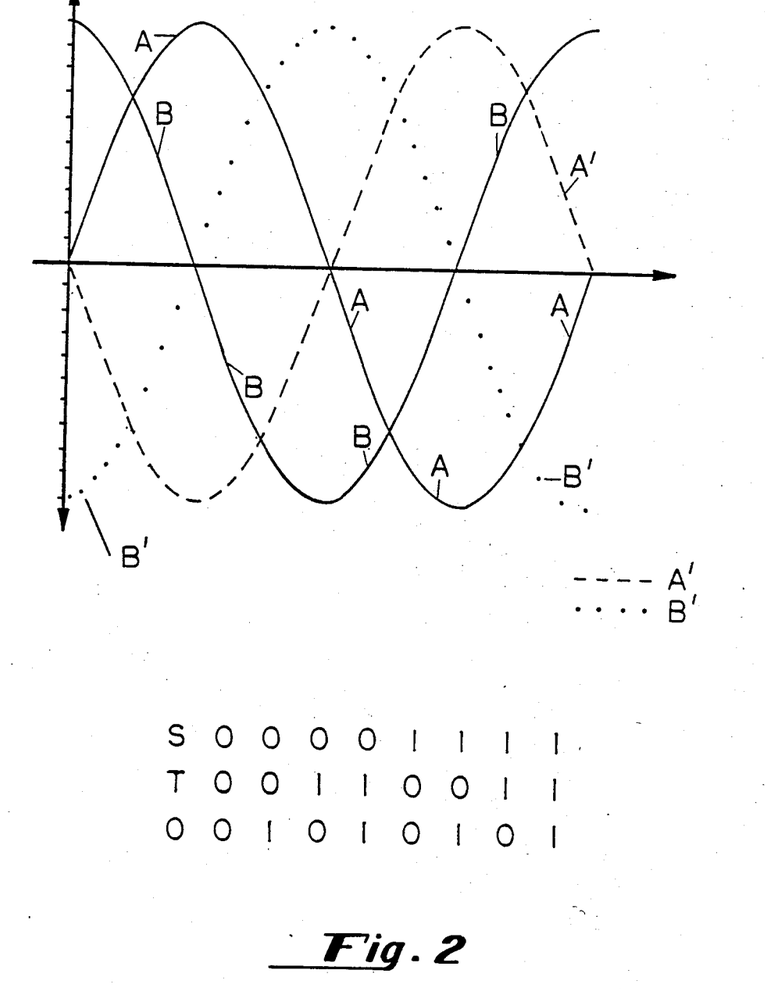
FIG. 2 is a graph showing the waveforms of the signals generated by the analog sensors of FIG. 1, and the complements of these signals, and also including a table showing the digital code which is assigned to each region of the waveform.

Analog sensor 3 is also labeled as "A", and sensor 5 is labeled as "B". The signals generated by these sensors are the A and B signals discussed above, with respect to FIG. 5, and will be designated throughout this specification as A and B. FIG. 2 includes a graph showing the waveforms of signals A and B, through 360° (magnetic) of rotation. Also shown are the analog complements of these signals, designated as A' and B'.

The 360° interval of the graph in FIG. 2 is divided into eight regions, each representing 45° of magnetic rotation. The present invention identifies the region in which the shaft is located, and designates this region by a unique digital code. One possible form for this digital code is indicated in the table in FIG. 2, below the graph. The digital code comprises three binary digits (bits), and the bits are labeled as "S", "T", and "O". It is seen that the values of S, T, and O, for each region, comprise the binary representations of the numbers from 0 to 7. However, other coding schemes can be used, as long as each region is uniquely specified.

Figure 3:
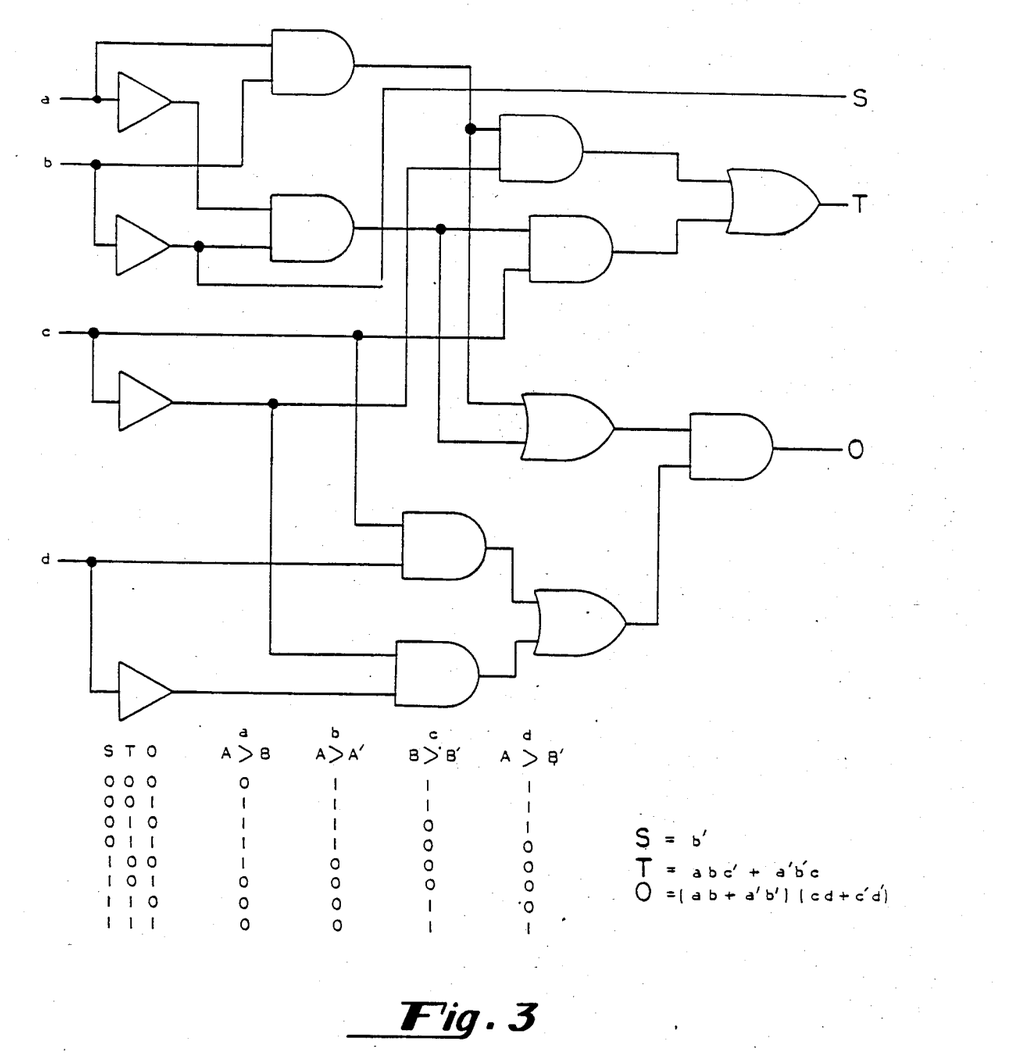
FIG. 3 shows a truth table and its associated logic circuit, for generating the digital code indicated in FIG. 2.

A means of determining the components S, T, and O of the digital code is illustrated in FIG. 3. The logical conditions describing each region are summarized in the four columns labeled A>B, A>A', B>B', and A>B'. These inequalities are represented respectively by logical variables a, b, c, d, which take the value of 1 if the inequality is true and 0 if the inequality is false. Thus, for example, in the first region, B>A, A>A', B>B', and A>B', so the entries in the table are 0,1,1, and 1. The equations for S, T, and O, as functions of a, b, c, and d, are given below the table, and a logic circuit embodying these equations is also shown. It is assumed that a, b, c, and d are obtained from suitable comparators which detect which of two inputs is greater. The logical circuit shown in FIG. 3 is only an example; it is possible to determine S, T, and O in other ways.

Figure 4:
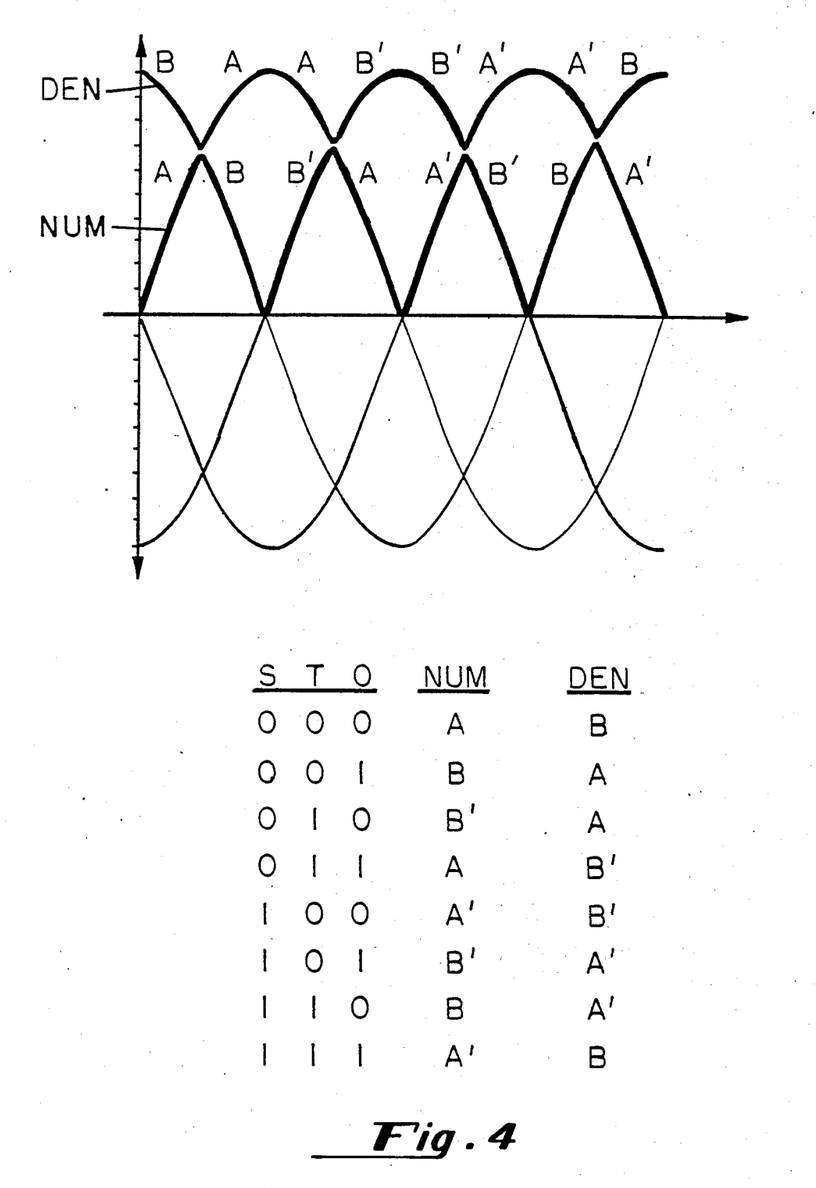
FIG. 4 includes a table and a graph, illustrating the selection of the pair of analog signals which will be used to form a quotient, in computing the next address in memory to be triggered.

Once the region information has been encoded into the digital code STO, the analog multiplexor 14 choses a pair of analog signals, the quotient of which is used to form the a relative address in the EPROM. FIG. 4 is a table and graph showing the function of the multiplexor. The two analog signals are designated "NUM" and "DEN" (meaning "numerator" and "denominator"). NUM and DEN are selected from the group consisting of A, B, A', and B', according to the value of STO, as given in the table. The resulting NUM and DEN signals are shown by the heavy lines in the graph in FIG. 4. It is seen that DEN is always greater than or equal to NUM, so that NUM/DEN will not exceed unity.

The NUM and DEN signals are fed into A/D converter 16, shown in FIG. 5. A/D converter 16 includes comparator 18, multiplier 20, AND gate 22, and digital counter 24. Comparator 18 produces digital outputs, labeled as x and y. If one input to comparator 18 is greater than the other input, then one output will be 1 and the other will be 0, and vice versa. It is preferred that comparator 18 be a "window" comparator. That is, comparator 18 should not indicate that one input is greater than the other until the inputs differ by a predetermined minimum amount. When the inputs are within this amount of each other, both x and y are zero.

Multiplier 20 is a device which accepts a digital input and an analog input, and produces an analog output proportional to the product of the inputs. As shown in FIG. 5, the analog input to the multiplier is the DEN signal, and the digital input is the output N of counter 24. The output of multiplier 20 is an analog signal equal to (N/256)*DEN, where "*" denotes multiplication. The factor of 256 is a scaling factor built into the multiplier circuit, but can be changed as desired.

Counter 24 is a standard digital up/down counter, made to "saturate" in a digital sense. That is, when it reaches its highest possible value, while counting upward, it holds that value, and when it reaches zero, while counting downward, it remains at zero.

Comparator 18, multiplier 20, and counter 24 are all commercially available components. For example, a multiplier circuit which has been used successfully is known by the designation DAC08, and can be obtained from Precision Monolithics, Inc., or from other sources. The comparator can be constructed from a variety of commercially available operational amplifiers, and up/down counters are similarly available.

If counter 24 is an eight-bit counter, A/D converter 16 produces an output N which equals (NUM/DEN) times 256, within 8 bits of quantization. Of course, the size of the counter can be changed. If the counter in n bits wide, the number 256 would be replaced by $2^n$. That the A/D conveter 16 produces the desired product is evident from the fact that the converter reaches equilibrium only when the inputs to comparator 18 are approximately equal. If NUM>(N/256)*DEN, then x becomes 1, activating the U/D (up/down) control of counter 24, causing the counter to count upward. If NUM<(N/256)*DEN, then x becomes 0, causing counter 24 to count downward. If NUM is approximately equal to (N/256)*DEN, within the window of the comparator, then x and y will be zero, and, by virtue of AND gate 22, the HOLD control of counter 24 will be enabled, causing the counter to stop. Thus, the A/D converter attains equilibrium only when NUM=(N/256)*DEN, i.e. when N=(NUM/DEN)*256.

Address generator 26 produces an address in memory device 28, based on the value of N and on the region, i.e. the value of the digital code STO. The memory device is preferably an EPROM, as mentioned above, but it is understood that other types of digital memory devices can be used. In this specification, the term "EPROM" will be used for convenience.

If the system is being used both to measure angular displacement and to provide commutation control, then the addresses activated in the EPROM will be determined not only by the value of N and the region, but also on the level of commutation advance or retard desired. As will be more fully explained, the ERPOM is preprogrammed to produce the same quadrature pulses, with different commutation pulses.

As the shaft turns, a series of addresses in the EPROM is triggered, and the resulting output comprises the desired quadrature and commutation pulse trains. When the shaft is turning through one particular region, the addresses in the EPROM will be activated sequentially. However, as will be described more fully below, as the shaft passes through successive regions, the direction of travel through the EPROM will be a "zig-zag" pattern, wherein certain segments of the EPROM are traversed in opposite directions. The term "sequential", as used herein, therefore refers to the sequential activation of EPROM addresses within a given region.

The EPROM is divided into several segments, each corresponding to a different level of commutation advance or retard. Each segment is divided into eight pieces, corresponding to the eight regions represented by the digital code STO. In each piece of the EPROM there are stored, in sequential form, the bits which together define the quadrature and commutation pulses.

As the shaft rotates at constant speed within a region, the value of N will move sequentially from 0 to 256 (for an eight-bit counter), or from 256 to 0. However, because of the sinusoidal nature of the A and B signals, this movement will not be linear. Instead the movement will be proportional to a tangent or cotangent function. This fact can be best understood from inspection of FIG. 4. When it is recalled that N is proportional to the quotient of NUM and DEN, and that NUM and DEN are 90° phase-shifted sinusoids, it is clear that N is proportional to $(\sin x)/(\cos x)$ or $(\cos x)/(\sin x)$, where x is the angular displacement of the shaft. Thus, the quotient must vary according to a tangent or cotangent function.

Because of the nonlinearity of the changes in N, the waveforms must be stored in the EPROM according to an arctangent rule. The net result is that as a region is traversed with constant angular velocity, the quadrature pulses coming out of the EPROM will be approximately evenly spaced.

FIG. 5 includes a feedback loop which shows how the monitoring of the quadrature pulse train can be used to control the commutation of the motor. The output of memory device 28 is fed to frequency multiplier 30, which converts the train of pulses into one of higher frequency. By increasing the frequency of the pulses, it is possible e to achieve higher resolution in monitoring the exact angular position of the shaft. The output of frequency multiplier 30 is connected to velocity monitoring device 32. Device 32 can be a differentiator, or a tachometer, or other means, and provides an output proportional to the rotational velocity of the shaft. Information on this rotational velocity is then fed to one of the inputs to address generator 26. Depending on the magnitude of the angular velocity, a different level of commutation advance or retard will be chosen. Address generator 26 activates a segment of memory device 28 which contains commutation signals corresponding to that level of advance or retard.

Frequency multiplier 30 can be any conventional circuit for frequency multiplication. For example, multiplier 30 can be a signal squaring circuit, based on the fact that $\sin^2 x = (1 - \cos 2x)/2$, etc. Note also that it is possible to square the analog A and B signals before processing by the digital circuitry. In the latter case, the signal squaring, or other multiplication function would be performed as part of the operation of signal conditioning circuit 10. It should be understood that if the frequencies of the A and B signals is modified by circuit 10, then circuit 30 could be omitted.

The output of the system is taken from multiplier circuit 30, as indicated by arrow 34. If the frequency multiplier 30 is omitted, then the output would come from memory device 28. The signal at arrow 34 will include, in general, both the guadrature and commutation pulses. The signal following the path of the arrow leading to block 32 can be either the guadrature or the commutation pulses, or both (in which case some of the pulse trains would be discarded).

Either the guadrature or the commutation signals can be used to monitor the rotational velocity. Although the frequency of the commutation signals is, in general, much less than that of the guadrature signals, the commutation signals can be used by velocity monitor 32 to provide a general estimate of rotational velocity. For purposes of providing commutation control, the relative lack of precision of the commutation signals is not an impediment.

The following discussion gives examples of how the EPROM can be programmed to produce the desired guadrature pulses, and to produce commutation pulses having the desired amounts of advance or retard. Example 1 explains the calculation for the guadrature pulses, and Example 2 gives a discussion of computation of the commutation pulses.

EXAMPLE 1

For the sake of simplicity and clarity, this example assumes that N ranges only from 1 to 20 (instead of 0 to 256, as in the discussion above). Also, the example deals with only one 45° region of rotation.

Table I contains an entry for each address of the EPROM. The first column designates the EPROM address. The second column gives a fraction of the EPROM segment, and ranges from 0 to 1, in increments of 1/20. The third column is the arctangent of the second column, divided by 45°, and multiplied by the "target resolution", which is 9 in this example. The fourth column is the third column rounded to the nearest integer. Rounding is necessary because the a pulse can change only over one EPROM address.

The last column is used to lay out one line of the EPROM. One begins by inserting a 0 or a 1, arbitrarily, in the selected bit of the starting address. One then moves down the fourth column of Table I, and inserts a value for the corresponding bit of the next address in the EPROM, depending on whether the value of the fourth column of Table I is the same as its value for the previous address, i.e. for the previous row of the table. For example, if address No. 1 contains a 0, then address No. 2 also contains a 0. But address No. 3 will contain a 1, because the value of column four of Table I has just changed from its previous value.

TABLE I

| EPROM Address | Fraction of EPROM | Arctan | Rounded Arctan |
|---|---|---|---|
| 1 | .05 | 0.572 | 1 |
| 2 | .10 | 1.142 | 1 |
| 3 | .15 | 1.706 | 2 |
| 4 | .20 | 2.262 | 2 |
| 5 | .25 | 2.807 | 3 |
| 6 | .30 | 3.340 | 3 |
| 7 | .35 | 3.858 | 4 |
| 8 | .40 | 4.360 | 4 |
| 9 | .45 | 4.846 | 5 |
| 10 | .50 | 5.313 | 5 |
| 11 | .55 | 5.762 | 6 |
| 12 | .60 | 6.193 | 6 |
| 13 | .65 | 6.605 | 7 |
| 14 | .70 | 6.998 | 7 |
| 15 | .75 | 7.374 | 7 |
| 16 | .80 | 7.732 | 8 |
| 17 | .85 | 8.073 | 8 |
| 18 | .90 | 8.397 | 8 |
| 19 | .95 | 8.706 | 9 |
| 20 | 1.00 | 9.000 | 9 |

Table II illustrates the structure of an EPROM segment having quadrature pulses programmed according to the rules given above. The line designated as "Quad A" has been derived from Table I as described. Note that it is assumed that each address of the EPROM contains eight bits, and that three of these bits (designated by x's) are unused. Also, Table II includes three lines of commutation pulses, designated as Comm 1, Comm 2, and Comm 3. The commutation pulses shown in Table II are hypothetical, and are shown only to depict the EPROM section in proper context. The calculation of the commutation pulses will be described in Example 2, below.

TABLE II

| Address: | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Comm 1 | 1 | 1 | 1 | 1 | 1 | 1 | 1 | 1 | 1 | 1 | 1 | 1 | 1 | 1 | 1 | 1 | 1 | 1 | 1 | 1 |
| Comm 2 | 1 | 1 | 1 | 1 | 1 | 1 | 1 | 1 | 1 | 1 | 1 | 1 | 1 | 1 | 0 | 0 | 0 | 0 | 0 | 0 |
| Comm 3 | 0 | 0 | 0 | 0 | 0 | 0 | 0 | 0 | 0 | 0 | 0 | 0 | 0 | 0 | 0 | 0 | 0 | 0 | 0 | 0 |
|  | x | x | x | x | x | x | x | x | x | x | x | x | x | x | x | x | x | x | x | x |
|  | x | x | x | x | x | x | x | x | x | x | x | x | x | x | x | x | x | x | x | x |
|  | x | x | x | x | x | x | x | x | x | x | x | x | x | x | x | x | x | x | x | x |
| Quad A | 0 | 0 | 1 | 1 | 0 | 0 | 1 | 1 | 0 | 0 | 1 | 1 | 0 | 0 | 0 | 1 | 1 | 1 | 0 | 0 |
| Quad B | 1 | 0 | 0 | 1 | 1 | 0 | 0 | 1 | 1 | 0 | 0 | 1 | 1 | 0 | 0 | 0 | 1 | 1 | 1 | 0 |

The line designated "Quad B" is the other member of the quadrature pulse line, and is formed by shifting the phase of Quad A by the number of addresses which corresponds to one-quarter of a period (i.e. 90°) of the pulse waveform. This number of addresses depends on the target resolution. In the example given, Quad A needs to be shifted by one address to produce Quad B. The 90° phase shift between the two signals accounts for the origin of the term "quadrature".

It is clear that the lines designated Quad A and Quad B generate pulses which are phase-shifted relative to each other. As illustrated in Table II, the frequency of the commutation pulses will, in general, be much lower than that of the quadrature pulses.

The present example concerns just one 45° region of rotation, i.e. one-eighth of the cycle. The remaining portions of the EPROM can be calculated by duplicating the quadrature entries shown in Table II, with proper regard for end points and phase relationships. There would thus be 160 addresses (8 times 20) needed to cover the entire 360° region. These 160 addresses would then be repeated for each level of commutation advance or retard.

As explained above, N ranges from 1 to 20, and then from 20 to 1, and then from 1 to 20, and so on. But the EPROM addresses that are triggered would be 1 to 20, then 40 to 21, then 41 to 60, then 80 to 61, and so on. That is the EPROM is traversed in a zig-zag fashion. The absolute address in EPROM is calculated from a knowledge of N and of the region in which the shaft is instantaneously located.

It is also possible, through appropriate control circuitry, to cycle back and forth through one region only, thereby eliminating the need to duplicate the pattern in more regions of the EPROM. Thus, considerable memory space could be saved. Whatever means of programming the various regions is used, it is important that the end points be chosen properly, so that the pulses do not abruptly change in width.

In the present example, the addresses of the EPROM will be traversed according to the rule address = round(tangent(angle)*resolution), where "round" means to round to the nearest integer. The above formula is correct only for the first, third, fifth, and seventh 45° region. For the alternate regions, the formula is address = round(tangent(45° − angle)*resolution).

As the EPROM is traversed in this nonlinear manner, the output pulses will be approximately uniformly spaced for a constant velocity of rotation.

Example 1 shows how to program the EPROM to produce the desired quadrature pulses. Example 1, however, does not show the calculation of the communtation pulses, but only shows a hypothetical arrangement of such pulses. The next example explains how to program the commutation pulses into the EPROM.

Figure 6:
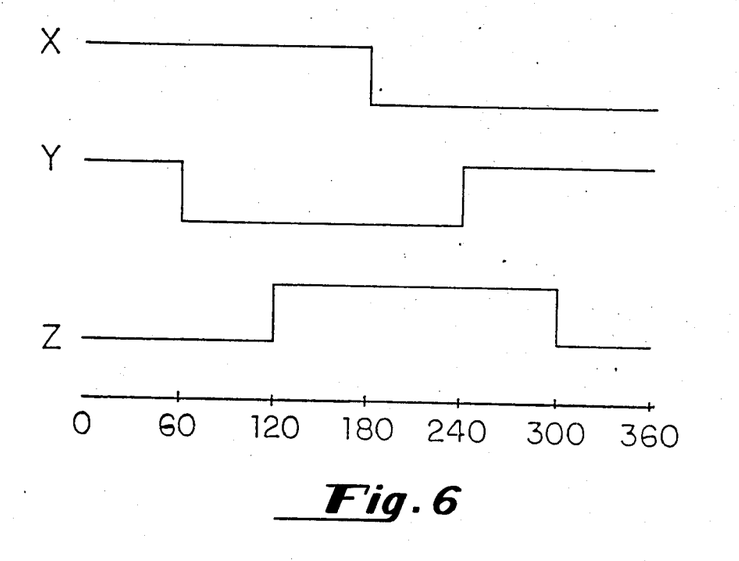
FIG. 6 is a diagram showing the waveforms of a set of commutation pulses for a brushless motor.

Before showing how to calculate the EPROM values for commutation pulses, it is helpful to review the nature of commutation pulses as they are known in the prior art. FIG. 6 is a graph showing three lines of pulses, designated as X, Y, and Z, for one 360° cycle. The pattern shown is assumed to repeat itself many times. These lines are used to determine which of the windings located around the motor shaft are energized. This example is developed for a three-phase motor, but, of course, different numbers of windings can be used.

As shown in FIG. 6, each control line is a logical "1" for one-half of the cycle, and the periods of operation for each winding are staggered as shown. This sequence is used in common practice; other sequences are also possible. As the rotational speed of the motor changes, it becomes desirable to "advance" or "retard" the commutation. This means simply that the pulses shown are shifted to the right or the left, in FIG. 6, by the desired number of degrees.

The present invention must program information, of the type shown in FIG. 6, into the EPROM. However, there are two problems which must be addressed. First, the EPROM is traversed in a zig-zag fashion, as described in Example 1, above, and this order of activation of EPROM addresses must be taken into account to produce the desired pulses. Secondly, the fact that, for constant rotational velocity, the addresses in EPROM are traversed nonlinearly over time must be taken into account, as was required in the case of the calculation of the quadrature pulses in Example 1.

EXAMPLE 2

Table III shows an example of a segment of the EPROM which has been programmed for commutation pulses, but without taking into account the nonlinear and zig-zag motions discussed above. The first three rows of Table III represent the bits which generate commutation signals similar to those of FIG. 6. The last two rows represent quadrature pulses, which could have been calculated by a method similar to that discussed above. In this example, the 360° region is represented by 72 addresses in EPROM. Each address in the EPROM is assumed to contain 5 bits. The asterisks denote the endpoints of the regions, and the region numbers (1-8) are also given. The numbers below the asterisks indicate the addresses.

TABLE III

| Region | 1 | | 2 | | 3 | | 4 | | 5 | | 6 | | 7 | | 8 | |
|---|---|---|---|---|---|---|---|---|---|---|---|---|---|---|---|---|
| | * | | * | | * | | * | | * | | * | | * | | * | |
| Address | | 1 | | 1 | 2 | | 2 | 3 | | 3 | 4 | | 4 | 5 | | 5 | 6 | | 6 | 7 |
| | 1...5....0....5....0....5....0....5....0....5....0....5....0....5....0.. |
| | 11111111111111111111111111111111111110000000000000000000000000000000000 |
| | 11111111100000000000000000000000000000000000001111111111111111111111111 |
| | 00000000000000000000001111111111111111111111111111111111111000000000000 |
| | 110011001100110011001100110011001100110011001100110011001100110011001100011 |
| | 10011001100110011001100110011001100110011001100110011001100110011\$01100110011001100110 |

As is apparent from Table III, the frequency of the commutation pulses is normally much less than that of the quadrature pulses.

The following discussion shows how to revise Table III to compensate for the zig-zag pattern of activation of addresses in the EPROM.

In the present example, wherein one 360° cycle is represented by 72 addresses in EPROM, as the shaft turns through one revolution, the EPROM is traversed in the following manner. First addresses 1 to 9 are activated, followed by addresses 18 to 10. Then addresses 19 to 27 are activated, followed by addresses 36 to 28, and so on. The addresses indicated by this zig-zag motion are represented by the following expressions. If x is the angle of rotation, then for the regions where $0° \leq x < 45°$, $90° < x < 135°$, $180° \leq x < 225°$, and $270° \leq x < 315°$, the address in the EPROM is given by $$\text{address} = (9*\text{int}(x/45)) + \text{int}((x \bmod 45)/5) + 1,$$

where "int(x)" means the greatest integer less than or equal to x. For the remaining regions, the address in the EPROM is given by $$\text{address} = (9*\text{int}(x/45)) + (9 - \text{int}((x \bmod 45)/5)).$$

It can be seen that the 9*int(x/45) term is analogous to the digital code STO, discussed above, and that the second term represents the ramping up and down of the digital quotient developed by A/D converter 16 of FIG. 5.

It is now possible to rewrite Table III to take into account the zig-zag manner of activation of the EPROM addresses. Table IV is the rewritten version of Table III. As the addresses of the EPROM illustrated in Table IV are activated in the zig-zag manner described above, the commutation pulses of FIG. 6 are recreated.

TABLE IV

| Region | 1 | | 2 | | 3 | | 4 | | 5 | | 6 | | 7 | | 8 | |
|---|---|---|---|---|---|---|---|---|---|---|---|---|---|---|---|---|
| | * | | * | | * | | * | | * | | * | | * | | * | |
| Address | | 1 | | 1 | 2 | | 2 | 3 | | 3 | 4 | | 4 | 5 | | 5 | 6 | | 6 | 7 |
| | 1...5....0....5....0....5....0....5....0....5....0....5....0....5....0.. |
| | 11111111111111111111111111111111111110000000000000000000000000000000000 |
| | 11111110000001110000000000000000000000011111100011111111111111111 |
| | 00000000000000000000011111111111111111111111111111111111111000000000000 |
| | 11001100011001101100110011001100100100110010001100110110010011001110011001 |
| | 1001100100110011100110011011001100011001100100100110011001101100110011001100 |

The EPROM map shown in Table IV still needs to be corrected for the nonlinear motion of the shaft. For the regions in which the EPROM addresses are activated in ascending numerical order, the relative address within the region is given approximately by $$\text{relative address} = (9*\tan(x \bmod 45)).$$

where round(x) = int(x + 0.5), and x is the angular displacement, in degrees, and where "A mod B" means the remainder after dividing A by B. The above expression is only approximate because of the discrete nature of the set of bits in the EPROM.

For the regions in which the EPROM addresses are activated in descending order, the approximate relative address within the region is given by $$\text{relative address} = \text{round}(9(*)\tan(45 - (x \bmod 45))).$$

The number "9" in the above formulas comes from the fact that each 45° region is represented in 9 EPROM addresses. This number must be changed for other EPROM resolutions.

To understand how the commutation pulse trains are adjusted for this nonlinearity, consider, for example, the third row of bits in Table III, representing the Z waveform of FIG. 6. This waveform goes from low (zero) to high (one) at 120°, which is in region 3, i.e. the third 45° region of rotational motion. The angle of 120° corresponds to address 25, which is in the third region (recall that each region contains nine addresses). The correct relative address at which this transition should be encoded in round(9(*)tan(120 mod 45))=5. The absolute address is the sum of the number of addresses in the preceding regions, plus one, plus the relative address. The "plus one" term is necessary to prevent the absolute address from becoming zero. The relative address can be zero in the example given. In the above example, there are 18 addresses in the preceding two regions, so the adjusted address is 18+1+5=24. This means that the transition shown at address 25 in Table III must be moved to address 24.

Table V shows a fragment of Table IV, indicating the correction. The other commutation lines in region 3 do not need correction because there are no transitions in this region for these lines. The one bit that is corrected is underlined.

TABLE V

```
 1      2      3      4      5      6      7      8
 *      *      *      *      *      *      *      *
    1   1   2   2   3   3   4   4   5   5   6   6   7
1...5....0....5....0....5....0....5....0....5....0....5....0....5....0..

111111111
          000000000
          000001111

001100110001100110110011001100111001100100110011000110011011001100111001100 1
011001100100110011100110011011001100011001100100110011100110011011001100
```

Similar adjustments are made to the remaining transitions.

The commutation signals depicted in Tables III, IV, and V are for zero commutation advance. To create an EPROM segment having, say, 30° of commutation advance, for a three-phase motor, one starts with the pattern shown in Table III, and shifts the bit patterns over by 6 addresses, since 6 addresses corresponds to 30° of rotation if 360° is represented in 72 addresses. The resulting table would be as shown in Table VI:

TABLE VI

```
 1      2      3      4      5      6      7      8
 *      *      *      *      *      *      *      *
    1   1   2   2   3   3   4   4   5   5   6   6   7
1...5....0....5....0....5....0....5....0....5....0....5....0....5....0..
1111111111111111111111111110000000000000000000000000000000000000000111111
111000000000000000000000000000000000000001111111111111111111111111111111111
000000000000000111111111111111111111111111111111111111110000000000000000000
100110011001100110011001100110011001100110011001100110011001100110011001100 11
001100110011001100110011001100110011001100110011001100110011001100110011001100 110
```

The first three lines represent pulse trains having a 30° commutation advance. One now needs to compensate for the zig-zag manner of travel through the EPROM, and for the nonlinear effect described above. The EPROM entries can be adjusted in the manner described earlier.

For each level of commutation advance or retard, a new section of EPROM can be provided. For each such section, only the commutation lines are changed; the quadrature tracks remain the same.

The examples given above show only one possible way of implementing the invention. It is possible to reconfigure the EPROM to reduce the amount of redundant information contained therein. For example, the EPROM could be programmed such that the quadrature pulses would be entered only once, and not for every level of commutation advance. It is also possible to program the EPROM, for quadrature, over only one region. With the proper control over the activation of addresses in the EPROM, one can cycle back and forth over, say, a 45° region, without the need to consider other regions. This is true because of the inherent symmetry of the problem; each 45° region yields pulses of similar configuration, except for changes in phase.

The present invention can be adapted to provide automatic control of a brushless motor. A circuit can be provided which determines the speed of the shaft by analyzing of one of the quadrature pulse trains. The rotational speed can be derived by differentiating the angular position, or by other means. The angular position is obtained simply by summing one of the quadrature pulse trains. The circuit can then select an appropriate level of commutation advance or retard, based on the measured speed of rotation. The operation of the motor is therefore improved for each speed, and the motor can be effectively used at various speeds without diminution in output torque. The present invention therefore not only measures the position of a motor shaft, but also helps to control the motor that drives the shaft.

The invention is not limited to the particular analog sensors used to generate the A and B signals. While linear Hall effect sensors have been suggested, any other sensor which produces an analog signal corresponding to the rotation of the shaft can be employed.

The invention is also not limited to the number of sensors. More than two sensors can be used, and their phase differences could be other than 90°. In the latter case, a new scheme of forming quotients must be used, and the quotient signals chosen will not, in general, vary according to a tangent or cotangent rule.

The number of regions into which the 360° rotation is divided may also be changed. It is possible to use almost any number of sensors and any number of regions. However, to a certain extent, the number of regions and the number of sensors are related, insofar as it is convenient to use certain numbers of regions based on the number of sensors, and vice versa. For example, the A and B signals, shown graphically in FIG. 2, most readily suggest the use of eight regions.

Of course, changing the number of regions and/or sensors will affect the calculations and some of the circuitry described above. If, for example, three sensors are used, there would be three analog signals A, B, and C. One could still form quotients from the group consisting of these signals and their complements, and use these quotients to generate EPROM addresses as described above. Of course, the quotients would not vary as tangent or cotangent functions, but instead would assume forms such as sin(x+d)/sin(x), and the like, where d is the phase shift between two sensors. The EPROM could be linearized to accomodate this nonlinear motion, in a manner similar to that described above, except that the values of the trigonometric functions could not be quickly obtained from standard tangent or arctangent tables, but would need to be specially calculated.

There are also other ways in which the analog multiplexor can be designed. The multiplexor 14 selects analog signals having a nonegative quotient. But it is also possible to choose one positive and one negative signal, and to include circuitry for inverting the sign of the quotient. It should be appreciated that there are many ways to select the signals which can be used to generate addresses in the digital memory 28, and that all of these are within the scope of the invention.

The memory device used in the present invention has been labeled an EPROM for convenience. Other memory devices can also be used. Any device which stores binary digits, and whose contents can be read upon command, can be used, within the scope of this invention. Also, the size and width (i.e. the number of bits per address) of the memory device can be varied. The greater the memory size, the greater the maximum resolution that will be achievable. The greater the memory width, the greater the number of pulse trains which can be simultaneously produced. It is preferred that the memory be wide enough to provide commutation control as well as quadrature pulses. However, the invention can be used to determine the angular displacement alone, or it can be used to provide commutation control and nothing else. It is understood that the modifications discussed above, and other similar variations, are to be considered within the spirit and scope of the following claims.

What is claimed is:

1. Apparatus for determining the angular displacement of a shaft, comprising:
   (a) means for originating a first pair of periodic analog signals in response to rotation of the shaft, the analog signals having phases which are displaced relative to each other, the originating means including means for producing the complements of said first pair of analog signals,
   (b) means connected to said originating means, for computing a digital code indicative of the region of a cycle in which said analog signals are momentarily located,
   (c) multiplexing means for assembling a second pair of analog signals, the second pair of analog signals being selected from one of the first pair of analog signals and their complements, the selection being done according to the value of said digital code,
   (d) means for generating a digital signal proportional to the quotient of said second pair of analog signals, and
   (e) digital memory means having a plurality of addresses programmed with binary digits corresponding to segments of pulses, the memory means being capable of transmitting the contents of a series of its addresses to an output stream, wherein the digital signal is connected to activate an address in the memory means, the address corresponding to the value of the digital signal, and wherein changes in the value of the digital signal cause different binary digits in the memory means to be transmitted into the output stream, forming pulses, and wherein the number of pulses corresponds to the angular displacement of the shaft.

2. The apparatus of claim 1, wherein the memory means is also programmed with a sequence of binary digits representing at least one commutation signal, wherein the commutation signal is capable of providing commutation control for a brushless motor.

3. The apparatus of claim 2, further comprising means for monitoring the angular velocity of the shaft, the monitoring means being connected to the output pulse stream, the monitoring means also being connected to affect the activation of addresses in the memory means by the digital signal, wherein different portions of the memory means can be activated according to the magnitude of the angular velocity of the shaft.

4. The apparatus of claim 1, wherein the originating means comprise linear Hall effect sensors.

5. The apparatus of claim 1, wherein the computing means comprises a network of gates, the network being designed to produce automatically the digital code from the values of the analog signals and their complements.

6. The apparatus of claim 1, wherein the generating means comprises a multiplier circuit, a comparator, and a digital counter, the comparator being connected to control the counter, the comparator being designed to signal the counter to count upward or downward when the output of the counter differs from the quotient, times a scaling factor, of said second pair of analog signals.

7. The apparatus of claim 1, further comprising means for multiplying the frequency of the pulses of the output stream.

8. The apparatus of claim 1, wherein the originating means comprises means for multiplying the frequency of the analog signals produced in response to rotation of the shaft.

9. Apparatus for determining the angular displacement of a shaft, comprising:
   (a) means for sensing the angular region in which the shaft is instantaneously located,
   (b) means connected to said sensing means, for generating a digital code indicative of said angular region,
   (c) means for generating at least one analog signal responsive to the amount of the angular region through which the shaft has passed,
   (d) means for converting said analog signal and said digital code into a digital address, and
   (e) digital memory means having a plurality of storage locations, the storage locations being programmed with a pattern of binary digits, the memory means being connected to the converting means, wherein the memory means is capable of transmitting pulses to an output stream each pulse being determined by the contents of the storage location, in the memory means, indicated by said digital address, and wherein the output stream of pulses corresponds to the angular displacement of the shaft.

10. The apparatus of claim 9, wherein the memory means is also programmed with a sequence of binary digits representing at least one commutation signal, wherein at least a portion of said commutation signal is capable of providing commutation control for a brushless motor.

11. The apparatus of claim 10, further comprising means for monitoring the angular velocity of the shaft, the monitoring means being connected to the output stream of pulses, the monitoring means also being operatively connected to the memory means, wherein different portions of the memory means can be activated according to the magnitude of the angular velocity of the shaft.

12. The apparatus of claim 9, wherein the analog signal generating means comprises at least one Hall sensor.

13. The apparatus of claim 9, wherein the digital code generating means comprises a network of gates, the network being designed to produce said digital code automatically, depending on the output of the sensing means.

14. The apparatus of claim 9, further comprising means for multiplying the frequency of the pulses of the output stream.

15. Apparatus for determining the angular displacement of a rotating shaft, comprising:
(a) digital memory means having a plurality of addresses, the digital memory means being programmed with at least one sequence of binary digits, the sequence of binary digits defining a predetermined stream of pulses, and
(b) means for activating a specific sequence of addresses in the memory means to produce an output signal, wherein the activating means is operatively connected to a means for sensing the angular position of the shaft,
wherein the output signal is a stream of pulses corresponding to the programmed sequence in the memory means, the frequency of which stream is proportional to the angular velocity of the shaft, the output signal being taken directly from the memory means.

16. The apparatus of claim 15, wherein the digital memory means is programmed with at least one additional sequence of binary digits, the additional sequence of binary digits being programmed to define a second stream of pulses suitable for providing commutation control for a brushless motor.

17. The apparatus of claim 16, further comprising means for monitoring the angular velocity of the shaft, the monitoring means being connected to monitor the first stream of output pulses, the monitoring means also being connected to affect the activation of addresses in the memory means, wherein different portions of the memory means can be activated according to the magnitude of the angular velocity of the shaft.

18. The apparatus of claim 15, further comprising means for multiplying the frequency of the output stream of pulses.

19. Apparatus for providing commutation control for a brushless motor, the motor having a shaft, comprising:
(a) digital memory means having a plurality of addresses, the digital memory means being programmed with at least one sequence of binary digits, the sequence of binary digits defining a predetermined stream of pulses, and
(b) means for activating a specific sequence of addresses in the memory means to produce an output signal, wherein the activating means is operatively connected to a means for sensing the angular position of the shaft,
wherein the output signal is a stream of pulses, the pulses comprising commutation signals suitable for control of the motor, and wherein the memory means also comprises means for advancing and retarding the commutation signals.

20. The apparatus of claim 19, wherein the memory means is programmed with at least one additional sequence of binary digits, the additional sequence of binary digits being programmed to define a second stream of pulses, the frequency of which second stream is proportional to the rotational velocity of the motor.

21. The apparatus of claim 20, further comprising means for multiplying the frequency of the second stream of pulses.

22. A method of determining the angular displacement of a rotating shaft, comprising the steps of:
(a) sensing the instantaneous orientation of the shaft, and computing a digital signal according to the sensed instantaneous orientation of the shaft,
(b) activating an address, corresponding to said digital signal, in a digital memory means, the memory means being preprogrammed with at least one sequence of binary digits, the binary digits defining at least one stream of pulses, and
(c) repeating the computing and activating steps, while counting the pulses in the stream and while converting the number of pulses into a value of angular displacement.

23. The method of claim 22, wherein the computing step comprises the steps of:
(a) generating at least two analog signals responsive to the rotation of the shaft,
(b) determining the angular region in which the shaft is momentarily located,
(c) forming a quotient of two voltages, times a scaling factor, the voltages being selected from the group consisting of the analog signals and their complements, the selection being done according to the region in which the shaft is located, such that the selection is unique for each region, and
(d) converting said quotient into said digital signal.

24. The method of claim 23, wherein the generating step comprises the step of positioning at least two analog sensors near the rotating shaft, the sensors being positioned to create a fixed phase difference between said analog signals.

25. The method of claim 23, wherein the determining step comprises passing the analog signals and their complements through a logic network, and generating a digital code indicative of the angular region in which the shaft is located, the digital code being used in the formation of said digital signal.

26. The method of claim 23, wherein the generating step includes the step of multiplying the frequency of the analog signals produced in response to the rotation of the shaft.

27. The method of claim 22, further comprising the step of multipying the frequency of said stream of pulses.

28. A method of simultaneously determing the angular displacement of a rotating shaft, and of commutating a motor for driving the shaft, comprising the steps of:
(a) sensing the instantaneous orientation of the shaft, and computing a digital signal according to the sensed instantaneous orientation of the shaft, and
(b) activating an address, corresponding to said digital signal, in a digital memory means, the memory means being pre-programmed with at least two sequences of binary digits, the binary digits defining at least two streams of pulses, wherein there is at least one velocity pulse stream having a frequency proportional to the rotational velocity of the shaft, and wherein there is at least one commutation pulse stream comprising a commutation signal for the motor, and (c) repeating the computing and activating steps, while counting the pulses in the velocity pulse stream and converting the number of pulses into a value of angular displacement, and while applying the commutation pulse stream to control the motor.

29. The method of claim 28, wherein the memory means includes at least two programmed segments, wherein the commutation pulse streams encoded in the segments have differing amounts of advance and retard, and wherein the respective segments of the memory means are activated in response to the rotational velocity of the motor, wherein the amount of advance and retard of commutation of the motor is automatically controlled in accordance with the velocity of the motor.

30. A digital memory circuit for generating a stream of pulses corresponding to the rotation of a shaft, the memory circuit comprising a plurality of addresses, each address containing at least one binary digit, the binary digits defining the stream of pulses, the circuit being divided into a plurality of regions, the regions corresponding to angular regions in which the shaft is instantaneously located, the binary digits in alternate regions being programmed for activation in opposite directions, and wherein the binary digits are arranged in a nonlinear form to compensate for nonlinear movement of the shaft, wherein activation of a sequence of addresses in the memory circuit causes the circuit to produce a stream of pulses indicative of the motion of the shaft.

31. The circuit of claim 30, wherein each address in the circuit contains at least two binary digits, and wherein the addresses of the circuit, when activated, produce at least two distinct pulse streams, defined by respective streams of the binary digits.

32. The circuit of claim 31, wherein at least one pulse stream encoded into the circuit comprises a stream of pulses for commutation of a brushless motor.

33. The circuit of claim 32, wherein the circuit comprises at least two segments, the segments being programmed to generate commutation pulses having varying amounts of advance are retard.

34. Apparatus for determining the angular displacement of a rotating shaft, comprising:

digital memory means having a plurality of addresses, the digital memory means being programmed with at least one sequence of binary digits, the sequence of binary digits defining a predetermined first stream of pulses, and means for activating a specific sequence of addresses in the memory means to produce an output signal, wherein the activating means is operatively connected to a means for sensing the angular position of the shaft, wherein the output signal includes said first stream of pulses corresponding to the programmed sequence in the memory means, the frequency of the first stream being proportional to the angular velocity of the shaft, wherein the digital memory means is programmed with at least one additional sequence of binary digits, the additional sequence of binary digits being programmed to define a second stream of pulses suitable for providing commutation control for a brushless motor, said apparatus further comprising means for monitoring the angular velocity of the shaft, the monitoring means being connected to monitor the output signal including said first stream of pulses, the monitoring means also being connected to affect the activation of addresses in the memory means, wherein different portions of the memory means can be activated according to the magnitude of the angular velocity of the shaft.

35. Apparatus for determining the angular displacement of a rotating shaft, comprising:

digital memory means having a plurality of addresses, the digital memory means being programmed with at least one sequence of binary digits, the sequence of binary digits defining a predetermined stream of pulses, and means for activating a specific sequence of addresses in the memory means to produce an output signal, wherein the activating means is operatively connected to a means for sensing the angular position of the shaft, wherein the output signal is a stream of pulses corresponding to the programmed sequence in the memory means, the frequency of which stream is proportional to the angular velocity of the shaft, said apparatus further comprising means for multiplying the frequency of the output signal.

36. A method of determining the angular displacement of a rotating shaft, comprising the steps of:

(a) computing a digital signal according to the instantaneous position of the shaft, (b) activating an address, corresponding to said digital signal, in a digital memory means, the memory means being preprogrammed with at least one sequence of binary digits, the binary digits defining at least one stream of pulses, and (c) repeating the computing and activating steps, while counting the pulses in the stream, wherein the computing step comprises the steps of:

(a) generating at least two analog signals responsive to the rotation of the shaft, (b) determining the angular region in which the shaft is momentarily located, (c) forming a quotient of two voltages, times a scaling factor, the voltages being selected from the group consisting of the analog signals and their complements, the selection being done according to the region in which the shaft is located, such that the selection is unique for each region, and (d) converting said quotient into said digital signal.

37. The method of claim 36, wherein the generating step comprises the step of positioning at least two analog sensors near the rotating shaft, the sensors being positioned to create a fixed phase difference between said analog signals.

38. The method of claim 37, wherein the determining step comprises passing the analog signals and their complements through a logic network, and generating a digital code indicative of the angular region in which the shaft is located, the digital code being used in the formation of said digital signal.

39. A method of simultaneously determining the angular displacement of a rotating shaft, and of commutating a motor driving the shaft, comprising the steps of:
(a) computing a digital signal according to the instanteous position of the shaft, and
(b) activating an address, corresponding to said digital signal, in a digital memory means, the memory means being pre-programmed with at least two sequences of binary digits, the binary digits defining at least two streams of pulses, wherein there is at least one velocity pulse stream having a frequency proportional to the rotational velocity of the shaft, and wherein there is at least one commutation pulse stream comprising a commutation signal for the motor, and
(c) repeating the computing and activating steps, while counting the pulses in the velocity pulse stream, and while applying the commutation pulse stream to control the motor,
wherein the memory means includes at least two programmed segments, wherein the commutation pulse streams encoded in the segments have differing amounts of advance and retard, and wherein the respective segments of the memory means are activated in response to the rotational velocity of the motor, wherein the amount of advance and retard of commutation of the motor is automatically controlled in accordance with the velocity of the motor.

* * * * *